(12) United States Patent
Yadav et al.

(10) Patent No.: US 12,039,145 B2
(45) Date of Patent: Jul. 16, 2024

(54) LEGEND OF GRAPHICAL OBJECTS

(71) Applicant: Lucid Software, Inc., South Jordan, UT (US)

(72) Inventors: Abhinav Yadav, Salt Lake City, UT (US); Nicholas Guyaux, Bluffdale, UT (US); Laura Luttmer, Albuquerque, NM (US); Elizabeth Beeli, Midvale, UT (US); Richard John Parker, West Jordan, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 0 days.

(21) Appl. No.: 17/658,916

(22) Filed: Apr. 12, 2022

(65) Prior Publication Data
US 2023/0325049 A1   Oct. 12, 2023

(51) Int. Cl.
| G06F 3/0482 | (2013.01) |
| G06F 3/04845 | (2022.01) |
| G06F 3/0486 | (2013.01) |

(52) U.S. Cl.
CPC ........ *G06F 3/0482* (2013.01); *G06F 3/04845* (2013.01); *G06F 3/0486* (2013.01)

(58) Field of Classification Search
CPC .. G06F 3/0481; G06F 3/04817; G06F 3/0482; G06F 3/0484; G06F 3/04845; G06F 3/0486
USPC ......................................................... 715/764
See application file for complete search history.

(56) References Cited

U.S. PATENT DOCUMENTS

| 5,414,809 A * | 5/1995 | Hogan | G06F 16/248 715/765 |
| 2006/0103676 A1* | 5/2006 | Schorr | G06F 40/258 345/629 |
| 2007/0043529 A1* | 2/2007 | Johnson | G01C 21/3807 702/150 |
| 2008/0104571 A1* | 5/2008 | Jaeger | G06F 3/0481 717/113 |
| 2008/0252643 A1* | 10/2008 | Joseph | G06T 11/206 345/440 |

(Continued)

OTHER PUBLICATIONS

Tsandilas, "StructGraphics: Flexible Visualization Design through Data-Agnostic and Reusable Graphical Structures", IEEE Transactions on Visualization and Computer Graphics, vol. 27, No. 2, Feb. 2021, pp. 315-325. (Year: 2021).*

(Continued)

*Primary Examiner* — Hwei-Min Lu
(74) *Attorney, Agent, or Firm* — Maschoff Brennan

(57) ABSTRACT

A computer-implemented method may include displaying, on a display device, a graphical diagram with multiple graphical objects that represent data of a data source. The method may include overlaying a legend on the graphical diagram, the legend including one or more legend data objects associated with a set of graphical objects of the graphical objects, each set of graphical objects including a common graphical attribute among the set of graphical objects. Additionally, the legend data objects may be configured to be user-interactable, where, upon interacting with a given legend data object, the set of graphical objects associated with the given legend data object are all selected such that by interacting with the given legend data object, all of the members of the associated set are interacted with.

18 Claims, 16 Drawing Sheets

(56) References Cited

U.S. PATENT DOCUMENTS

| | | | | |
|---|---|---|---|---|
| 2011/0161874 A1* | 6/2011 | Doughty | ................... | G06F 8/33 |
| | | | | 715/764 |
| 2013/0046799 A1* | 2/2013 | Hale | ..................... | G06F 16/211 |
| | | | | 707/805 |
| 2013/0232174 A1* | 9/2013 | Krajec | ................ | G06F 16/9024 |
| | | | | 707/798 |
| 2014/0189651 A1* | 7/2014 | Gounares | ............ | G06F 11/3636 |
| | | | | 717/125 |
| 2014/0380176 A1 | 12/2014 | Arquie et al. | | |
| 2016/0042402 A1* | 2/2016 | Gadre | ................ | G06Q 30/0269 |
| | | | | 705/14.66 |
| 2017/0116167 A1* | 4/2017 | Kutilek | ................... | G06T 11/60 |
| 2017/0236312 A1* | 8/2017 | Ruble | ................... | G06T 11/206 |
| | | | | 345/440 |
| 2018/0181567 A1 | 6/2018 | Bator et al. | | |
| 2020/0228412 A1 | 7/2020 | Abu Asba et al. | | |
| 2022/0108276 A1* | 4/2022 | Stringham | .......... | G06F 3/04817 |

OTHER PUBLICATIONS

International Search Report and Written Opinion issued in corresponding application No. PCT/US2023/014988, dated Jun. 28, 2023.

* cited by examiner

LEGEND OF GRAPHICAL OBJECTS

FIELD

The embodiments discussed herein are related to legends of graphical objects.

BACKGROUND

Unless otherwise indicated herein, the materials described herein are not prior art to the claims in the present application and are not admitted to be prior art by inclusion in this section.

Some structured source data, e.g., of networks, organizations, or other structured source data, lends itself to representation in the form of a diagram or other visualization, such as a network diagram or an organizational chart. Some diagram applications allow users to generate graphical diagrams on a computer based on the structured source data. Such graphical diagrams may include graphical objects that represent data objects, resources, or nodes in the structured source data.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, a computer-implemented method may include displaying, on a display device, a graphical diagram with multiple graphical objects that represent data of a data source. The method may include overlaying a legend on the graphical diagram, the legend including one or more legend data objects associated with a set of graphical objects of the graphical objects, each set of graphical objects including a common graphical attribute among the set of graphical objects.

In an example embodiment, a non-transitory computer-readable medium may include computer-readable instructions stored thereon that are executable by a processor to perform or control performance of operations. The operations may include displaying, on a display device, a graphical diagram with multiple graphical objects that represent data of a data source. The operations may include overlaying a legend on the graphical diagram, the legend including one or more legend data objects associated with a set of graphical objects of the graphical objects, each set of graphical objects including a common graphical attribute among the set of graphical objects.

Additional features and advantages of the present disclosure will be set forth in the description which follows, and in part will be obvious from the description, or may be learned by the practice of the present disclosure. The features and advantages of the present disclosure may be realized and obtained by means of the instruments and combinations particularly pointed out in the appended claims. These and other features of the present disclosure will become more fully apparent from the following description and appended claims, or may be learned by the practice of the present disclosure as set forth hereinafter.

BRIEF DESCRIPTION OF THE DRAWINGS

To further clarify the above and other advantages and features of the present disclosure, a more particular description of the present disclosure will be rendered by reference to specific embodiments thereof which are illustrated in the appended drawings. It is appreciated that these drawings depict only typical embodiments of the present disclosure and are therefore not to be considered limiting of its scope. The present disclosure will be described and explained with additional specificity and detail through the use of the accompanying drawings in which.

DETAILED DESCRIPTION OF SOME EXAMPLE EMBODIMENTS

Some graphical diagrams representative of data sources may be difficult to understand completely, or may include nuances that may not be readily apparent to a person observing the graphical diagram. In these and other circumstances, it may be beneficial to provide a legend that provides context to the meaning behind certain graphical attributes, such as a given shape, given color, given line style, among other attributes. By providing the legend, a user interacting with the graphical diagram may have an easier time understanding the graphical objects in the graphical diagram.

Some embodiments herein may permit users to interact with sets of graphical objects by interacting with the legend itself. For example, rather than being a static overlay of information, the legend may permit interaction with the graphical diagram. In some embodiments, by selecting a legend object, all of the graphical objects associated with the legend object may be selected, or highlighted, or have their properties changed. Additionally, in some embodiments, the legend may automatically update to reflect conditional formatting of the graphical objects. The legend may additionally or alternatively reflect the context being viewed of the graphical diagram.

Reference will now be made to the drawings to describe various aspects of example embodiments of the present disclosure. It is to be understood that the drawings are diagrammatic and schematic representations of such example embodiments, and are not limiting of the present disclosure, nor are they necessarily drawn to scale.

Figure 1:
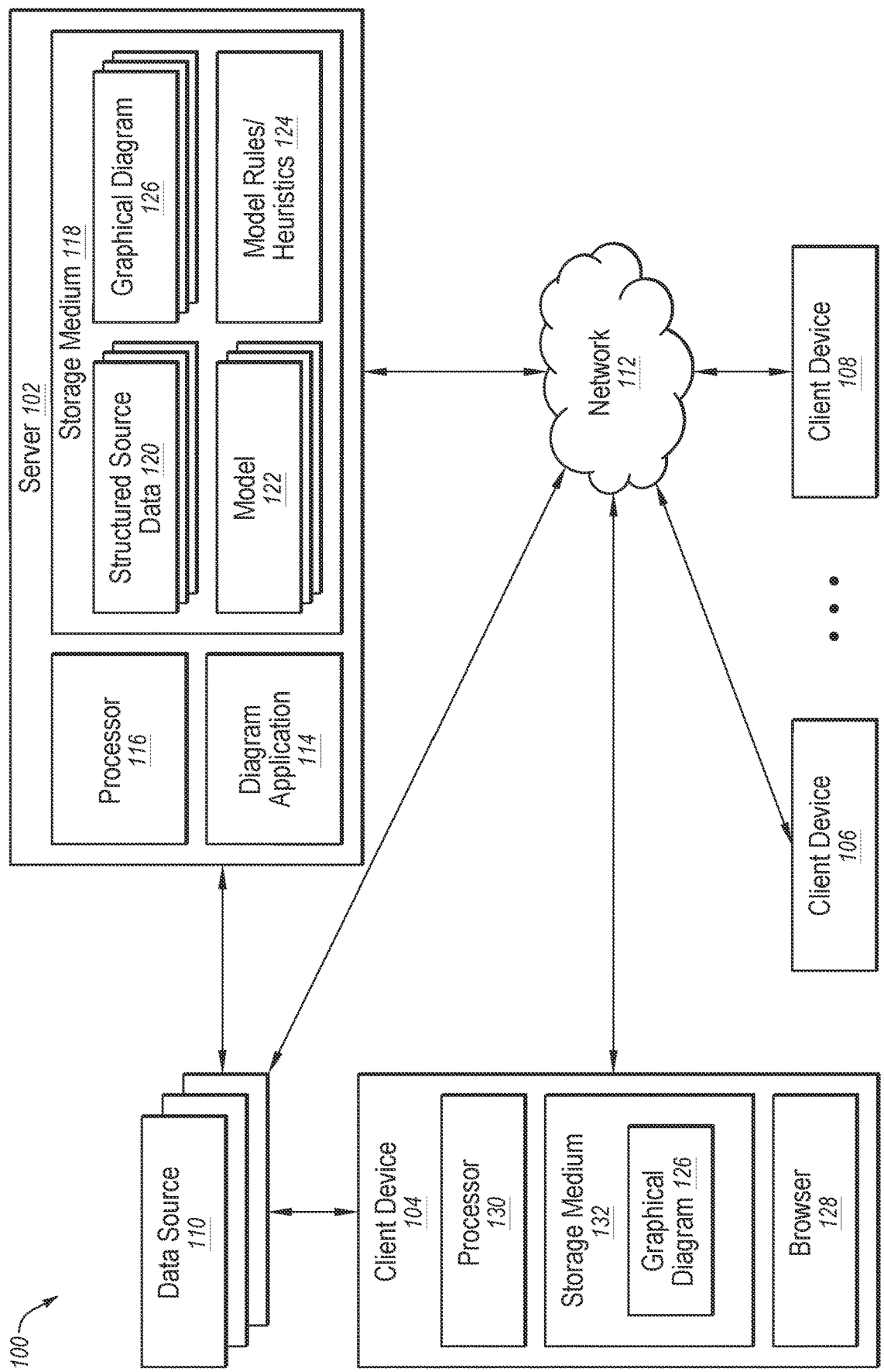
FIG. 1 is a block diagram of an example operating environment that includes a server and one or more client devices.

FIG. 1 is a block diagram of an example operating environment 100 that includes a server 102 and one or more client devices 104, 106, 108, arranged in accordance with at least one embodiment described herein. The server 102 and/or the client devices 104, 106, 108 may be configured to generate and display graphical diagrams or visualizations that include graphical objects based on structured source data. The terms graphical diagram and visualization are used interchangeably herein. In some embodiments, users may be able to create user-defined groups of graphical objects in graphical diagrams.

The structured source data may be received from one or more data sources 110. Each of the data sources 110 may include, for example, a cloud infrastructure provider such as AWS, GOOGLE CLOUD, or MICROSOFT AZURE; a human resources (HR) system or database such as BAMBOOHR or WORKDAY; a customer relationship management (CRM) system such as SALESFORCE.COM or MICROSOFT DYNAMICS CRM; a spreadsheet for HR, e.g., with names, pictures, and/or a reporting structure for employees of an entity; a custom internal logging system; a floorplan database (e.g., with employee office/workstation assignments); a database schema (e.g., to generate Entity Relationship Diagrams); a service-oriented architecture; physical network discovery tools; custom-built technical systems that can be modeled similar to a network; or other suitable data source and/or data collection. The data in each of the data sources 110 may have a specific format, which may be different and/or the same from one data source 110 to another. Some example data formats include proprietary formats, Structured Query Language (SQL), and JavaScript Object Notation (JSON).

The structured source data may identify two or more nodes, resources, and/or other entities and relationships among them. For instance, the structured source data may identify various network resources such as compute nodes, storage nodes, database nodes, networking nodes (e.g., virtual private clouds (VPCs)), regions, availability zones (AZs), and/or other resources deployed by a customer in AWS as well as relationships among the entities, such as specific ports over which specific nodes can communicate or specific VPCs and/or AZs to which compute nodes belong. As another example, the structured source data may identify databases and tables within databases and/or other entities in a database schema as well as relationships among the entities, such as foreign and/or primary keys. As another example, the structured source data may identify employees, executives, owners and/or other personnel of a company as well as their relationships to each other, such as relative ranks and organization into one or more divisions, departments, or other logical units.

Each graphical diagram may graphically represent one or more of the nodes using one or more graphical objects. In particular, each node may be represented by or otherwise associated with a set of one or multiple graphical objects. For example, compute nodes and database nodes of AWS structured source data may each be represented by a corresponding graphical node in a graphical diagram. As another example, a node of an employee or other individual in an organization may be graphically represented by a box or other shape outline (e.g., a first graphical object), a photo of the employee (e.g., a second graphical object), text (e.g., a third graphical object) that may include the employee's name, office location, and/or other information, and/or a connector (e.g., a fourth graphical object) that indicates the employee's supervisor or manager or other individual the employee reports to.

Graphical objects that represent nodes in structured source data may be referred to as data-backed graphical objects. Data-backed graphical objects may be explicitly stored as and/or represented by data collections in structured source data. Each data-backed graphical object may have a corresponding data collection or attribute schema in a set of structured source data that explicitly identifies attributes of the graphical object, such as graphical attributes (e.g., fill color, outline color, shape, icon, line color, line ending, line attributes, among other visual characteristics) as well as other attributes such as resource type or other attribute(s).

The server 102 and/or the client devices 104, 106, 108 may be configured to automatically generate graphical diagrams based on structured source data. The graphical diagrams may be generated based on contract maps. Alternatively or additionally, automatically-generated graphical diagrams or graphical objects therein may be customized by application of conditional formatting. In some embodiments, updates made to the graphical drawings, e.g., to graphical objects within the graphical drawings that represent the nodes, may be propagated back to the structured source data in some circumstances. Alternatively or additionally, the server 102 and/or the client devices 104, 106, 108 may be configured to apply one or more reversible data transforms to the structured source data when generating graphical diagrams. Additional details regarding contract maps, customization of graphical diagrams, conditional formatting, updating structured source data, and reversible data transforms are disclosed in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Although one server 102 and three client devices 104, 106, 108 are illustrated in FIG. 1, the operating environment 100 may more generally include one or more servers 102 and one or more client devices 104, 106, 108. In these and other embodiments, the operating environment 100 may include other servers and/or devices not illustrated in FIG. 1.

The operating environment 100 may additionally include a network 112. In general, the network 112 may include one or more wide area networks (WANs) and/or local area networks (LANs) that enable the server 102, the client devices 104, 106, 108, and the data sources 110 to communicate with each other. In some embodiments, the network 112 may include the Internet, including a global internetwork formed by logical and physical connections between multiple WANs and/or LANs. Alternately or additionally, the network 112 may include one or more cellular radio frequency (RF) networks and/or one or more wired and/or wireless networks such as 802.xx networks, Bluetooth access points, wireless access points, Internet Protocol (IP)-based networks, or other wired and/or wireless networks. The network 112 may also include servers that enable one type of network to interface with another type of network.

In general, the server 102 may host a web-based diagram application (hereinafter application) 114 that allows the client devices 104, 106, 108 to generate and display graphical diagrams. In other embodiments, the application 114 may include a non-web-based application but may generally be described herein as a web-based application for simplicity. Alternatively or additionally, some or all of the functionality described as being performed by the diagram application 114 may be performed locally on the client devices 104, 106, 108, such as by a browser or other application executed by the client devices 104, 106, 108.

The server 102 may additionally include a processor 116 and a storage medium 118. The processor 116 may be of any type such as a central processing unit (CPU), a microprocessor (µP), a microcontroller (µC), a digital signal processor (DSP), or any combination thereof. The processor 116 may be configured to execute computer instructions that, when executed, cause the processor 116 to perform or control performance of one or more of the operations described herein with respect to the server 102.

The storage medium 118 may include any non-transitory computer-readable medium, including volatile memory such as random access memory (RAM), persistent or non-volatile storage such as read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer storage medium. The storage medium 118 may store computer instructions that may be executed by the processor 116 to perform or control performance of one or more of the operations described herein with respect to the server 102.

The storage medium 118 may additionally store one or more sets of structured source data 120, one or more models 122, model rules and/or heuristics 124 ("Model Rules/Heuristics" in FIG. 1), and/or one or more graphical diagrams 126. Each set of structured source data 120 may be imported from a corresponding one of the data sources 110. The structured source data 120 may be imported over the network 112 or directly from the corresponding data source 110 if a direct connection exists.

The model rules and/or heuristics 124 include rules and/or heuristics that may be applied to the structured source data 120 to derive information about the nodes and/or their relationships represented in the structured data. The structured source data 120 and/or the information derived by the model rules and/or heuristics 124 may be used by the server 102 to generate the models 122, each model 122 corresponding to a different set of structured source data 120. Each of the graphical diagrams 126 may be generated directly from a corresponding set of the structured source data 120 and/or from a corresponding one of the models 122 derived from the corresponding set of structured source data 120. The graphical diagrams 126 may be generated based on input received from users at the client devices 104, 106, 108 and may include some or all of the nodes or other entities represented in the corresponding set of structured source data 120 and/or in the corresponding model 122 derived from the corresponding set of structured source data 120.

Each of the client devices 104, 106, 108 may execute an application, such as the browser 128, configured to communicate through the network 112 with the server 102. The browser 128 may include an Internet browser or other suitable application for communicating through the network 112 with the server 102. The browser 128 may generate, download and/or interact with structured source data 120 and/or graphical diagrams 126. Each of the client devices 104, 106, 108 may include a desktop computer, a laptop computer, a tablet computer, a mobile phone, a smartphone, a personal digital assistant (PDA), a wearable device (e.g., a smart watch), or another suitable client device.

Each of the client devices 104, 106, 108 may additionally include a processor and a storage medium, such as a processor 130 and a storage medium 132 as illustrated for the client device 104 in FIG. 1. Each of the other client devices 106, 108 may be similarly configured. Similar to the processor 116 of the server 102, the processor 130 may be of any type such as a CPU, a µP, a µC, a DSP, or any combination thereof. The processor 130 may be configured to execute computer instructions that, when executed, cause the processor 130 to perform or control performance of one or more of the operations described herein with respect to the client device 104 and/or the browser 128.

Similar to the storage medium 118 of the server 102, the storage medium 132 of the client device 104 may include any non-transitory computer-readable medium, including volatile memory such as RAM, persistent or non-volatile storage such as ROM, EEPROM, CD-ROM or other optical disk storage, magnetic disk storage or other magnetic storage device, NAND flash memory or other solid state storage device, or other persistent or non-volatile computer storage medium. The storage medium 132 may store computer instructions that may be executed by the processor 130 to perform one or more of the operations described herein with respect to the client device 104 and/or the browser 128. The storage medium 132 may additionally store, at least temporarily, a graphical diagram 126, some of a corresponding set of structured source data 120 or model 122, and/or other content obtained from the server 102 and/or generated locally on the client device 104.

In some embodiments, the browser 128 on the client devices 104, 106, 108, the diagram application 114 on the server 102, and/or other application, system, or device may execute a layout algorithm to generate and display graphical diagrams 126 on displays of or coupled to the client devices 104, 106, 108. The resources, nodes, or other entities of the structured source data 120 may be arranged hierarchically. In these and other embodiments, the layout algorithm may recursively call down to the bottom of the hierarchy how much space is needed for graphical objects representing resources or nodes at each level of the hierarchy. At each level of the hierarchy, the algorithm may determine how much space a graphical object such as a container graphical object needs based on the space needed by each graphical object at the next lowest level of the hierarchy that is included in the container graphical object and an amount of padding (e.g., around the constituent graphical objects or the container graphical object itself) which may be a fixed parameter, a configurable parameter, and/or may be determined in some other manner. In effect, layout information at lower levels of the hierarchy bubbles up to the higher levels of the hierarchy allowing the layout algorithm to determine which containers to generate, the size of each container, where to position them, a number and size and location of rows and/or columns within each container, a size and location of each graphical object, and so on.

Embodiments described herein are not limited to using a browser to communicate with the server 102 to generate and display graphical diagrams 126 and group and collapse graphical objects therein. For example, rather than or in addition to a browser, the client devices 104, 106, 108 may include a native app as are often used on client devices such as mobile devices including smartphones and tablet computers. Accordingly, embodiments described herein generally include generating and displaying graphical diagrams and grouping and collapsing graphical objects therein using a browser, a native app, or another suitable application on the client devices 104, 106, 108.

Figure 2:
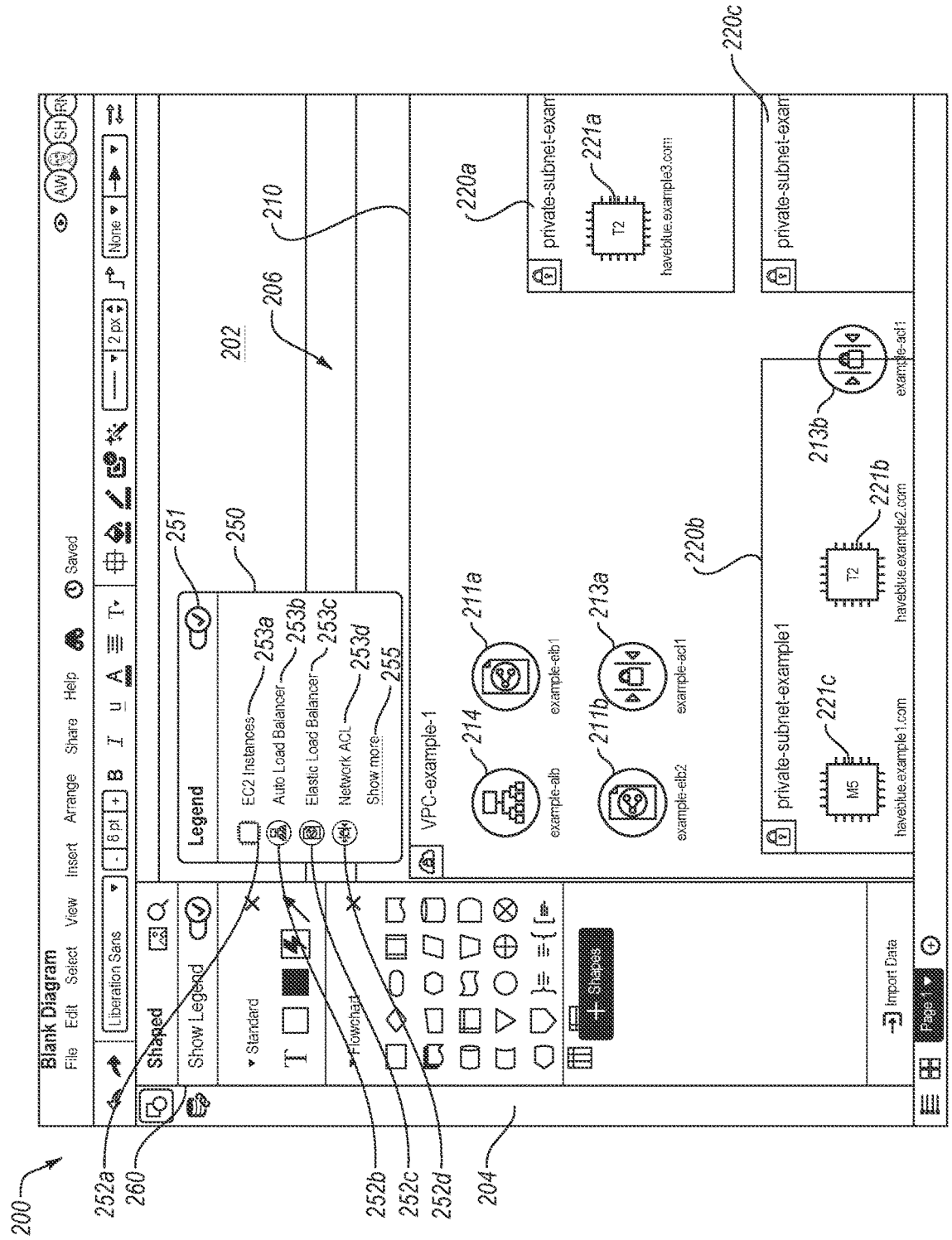
FIG. 2 illustrates a graphical representation of a user interface (UI) that includes a legend.

FIG. 2 illustrates a graphical representation 200 of a user interface (UI) that includes a legend, in accordance with one or more embodiments of the present disclosure. The UI may be provided by the browser 128 and/or the diagram application 114 of FIG. 1. For instance, the browser 128 in cooperation with the diagram application 114 may present the UI to a user through a display of the client device 104.

In FIG. 2 the graphical representation 200 includes a graphical drawing canvas 202, a panel 204 to one side of the graphical drawing canvas 202, one or more menus, and/or other UI elements. In other embodiments, the panel 204 may be positioned in some other location relative to the graphical drawing canvas 202 and/or may be expanded into two or more panels. For example, the panel 204 may be positioned on a left side, above, or below the graphical drawing canvas 202 or other location relative to the graphical drawing canvas 202 and/or may be divided into two or more panels positioned in two or more locations relative to the graphical drawing canvas 202.

In general, graphical drawings or diagrams of structured source data may be displayed in the graphical drawing canvas 202. In FIG. 2, the graphical drawing canvas 202 displays an example graphical diagram 206 that includes various graphical objects that represent resources or nodes in underlying structured source data. The graphical objects in this example include various AWS icons to represent AWS nodes, resources, entities, or the like, including a virtual private cloud (VPC) graphical object 210 that represent a VPC; elastic load balancer (ELB) graphical objects 211a and 211b that represent ELBs; network access control list (ACL) graphical objects 213a and 213b that represent ACLs; automatic load balancing (ALB) graphical object 214 that represents an ALB; one or more private subnet graphical objects 220a, 220b, and 220c that represent private subnets within the VPC 210; and compute node graphical objects 221a, 221b, and 221c that represent compute resources.

The graphical drawing canvas 202 may display a legend 250. The legend 250 may display one or more legend objects 252, such as the legend objects 252a, 252b, 252c, and 252d. The legend 250 may include one or more text labels 253, such as the text labels 253a, 253b, 253c, and 253d. The text labels 253 may correspond to the legend objects 252 such that the meaning of a given graphical object may be understood by observing the legend 250. For example, the legend object 252a includes a graphical representation corresponding to the compute node graphical objects 221a-c and may include a text label 253a of "EC2 instances" corresponding to elastic cloud computing (EC2) resources, or computing resources. By observing the legend 250, a user utilizing the UI may readily understand the meaning behind the graphical objects of the graphical diagram 206.

In some embodiments, the legend 250 may include a toggle 251 for showing or hiding the legend 250 in the UI. Additionally or alternatively, a second toggle 260 may be in the panel 204 via which the legend may be shown or hidden.

In addition to utilizing the legend 250 to understand and better comprehend aspects of the graphical diagram 206, the legend 250 may additionally provide an alternative interface for interacting with the graphical diagram 206 and/or the data underlying the graphical diagram 206. Various examples of such interactions may be described with greater detail in reference to FIGS. 4A-4B and/or FIGS. 6-8.

Figure 3A:
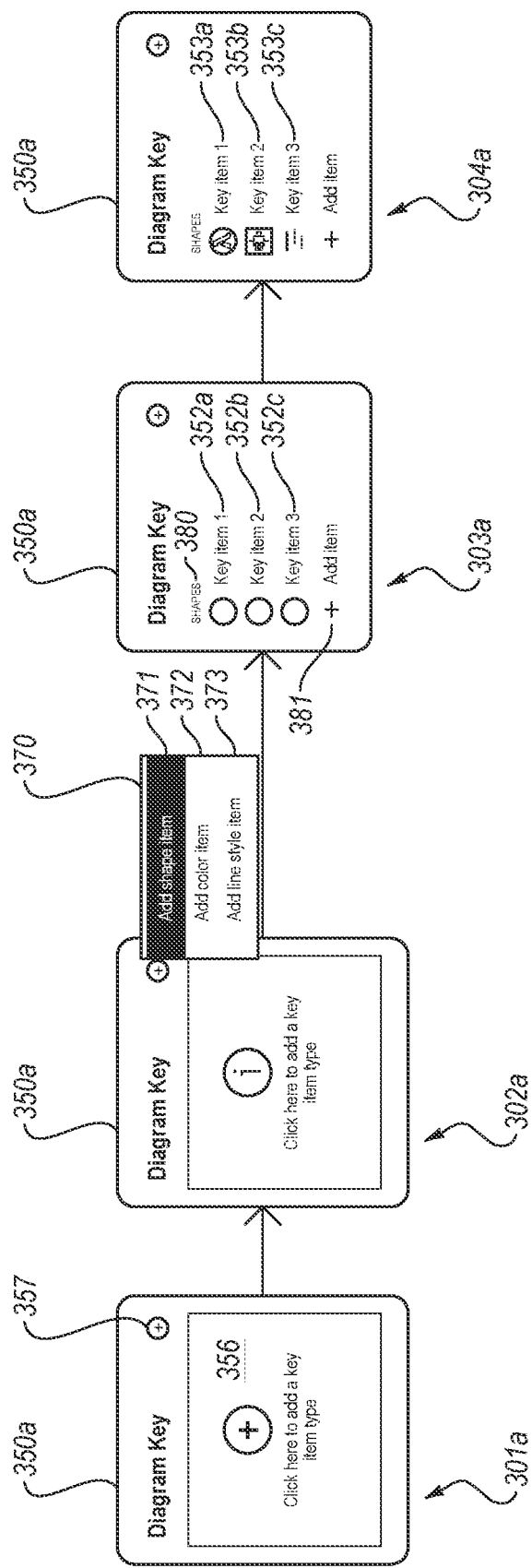
FIGS. 3A-3C illustrate graphical representations of portions of a UI used in implementing a legend.
Figure 3B:
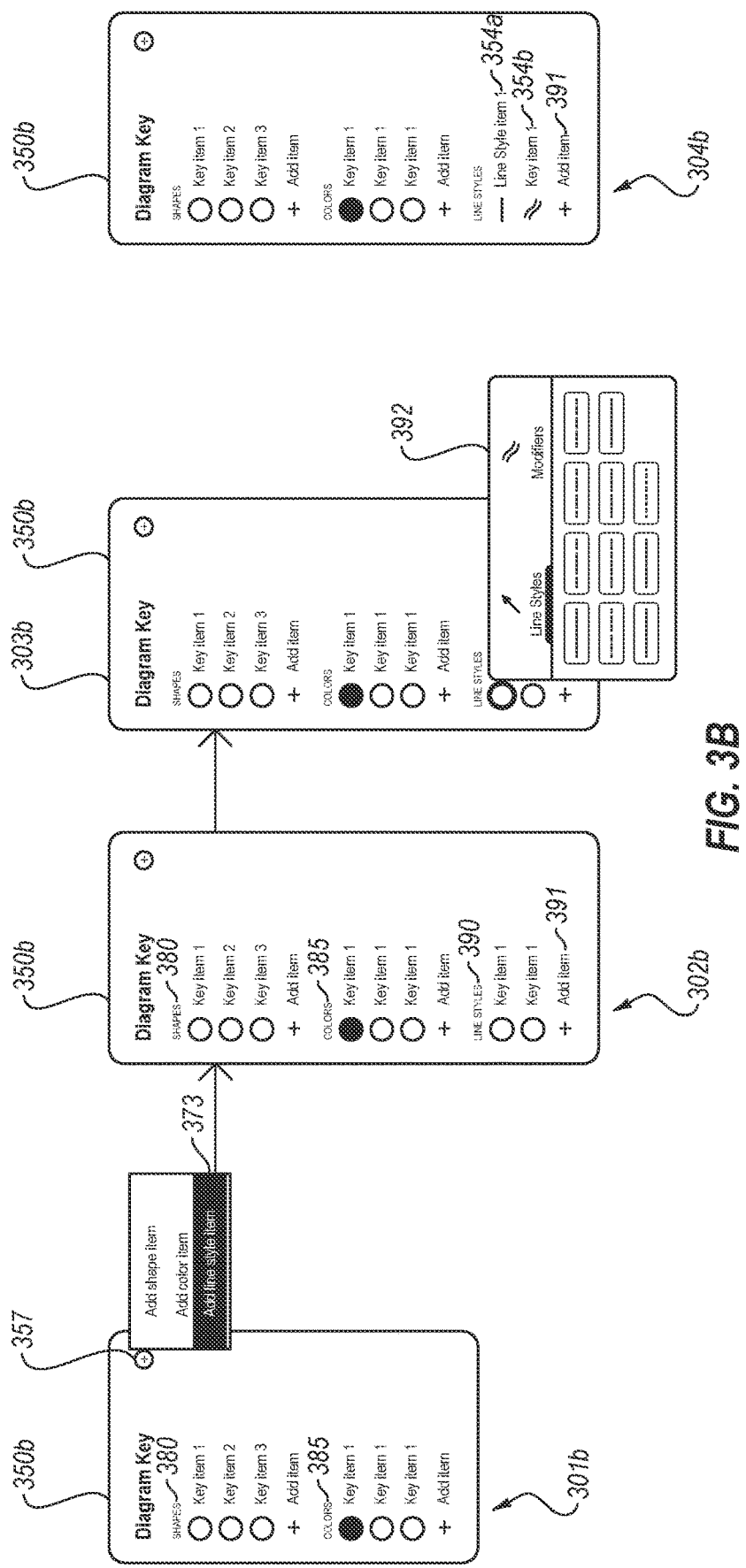
Figure 3C:
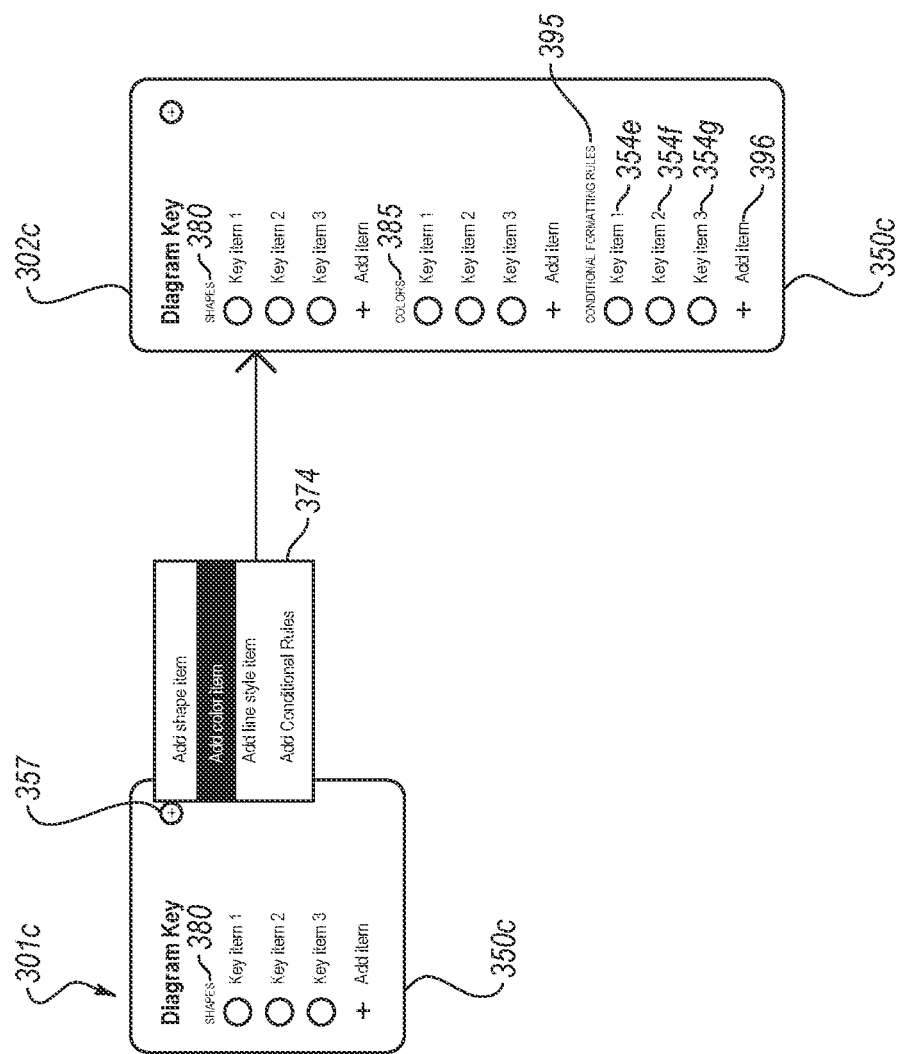

FIGS. 3A-3C illustrate graphical representations of portions of a UI used in implementing a legend, in accordance with one or more embodiments of the present disclosure. FIG. 3A illustrates a series of graphical representations 301a, 302a, 303a, and 304a depicting adding of shapes to a legend 350a. FIG. 3B illustrates a series of graphical representations 301b, 302b, 303b, and 304b depicting adding line styles to a legend 350b. FIG. 3C illustrates a series of graphical representations 301c and 302c depicting adding items with conditional formatting to a legend 350c.

As illustrated in the graphical representation 301a of FIG. 3A, a user may interact with the legend 350a to add additional elements to the legend 350a. For example, a user may interact with an "add" icon 357 or an empty canvas 356 of the legend 350a.

As illustrated in the graphical representation 302a of FIG. 3A, a menu box 370 may be displayed responsive to the interaction described with the graphical representation 301a. The menu box 370 may include an option to add a shape item 371, add a color item 372, and/or add a style item 373, with the add a shape item 371 option highlighted, indicating the user interacts with that particular option in the menu box 370.

As illustrated in the graphical representation 303a of FIG. 3A, the legend 350a may be updated to include one or more legend data objects 352 such as the legend data objects 352a-c. In adding the legend data objects 352, they may be added as generic legend data objects without any data sets connected to the legend data objects 352, which may be organized beneath a title 380 (such as "shapes") that may identify the type of legend data object within a given region of the legend 350a. For example, the generic legend data objects 352 may act as placeholders within the legend 350a with which the user may interact to customize the legend data objects 352. Additionally or alternatively, the legend 350a may include an add feature 381 with which the user may interact to add an additional shape-based legend data object.

As illustrated in the graphical representation 304a of FIG. 3A, the legend 350a may be updated such that the legend data objects 353 (for example, the legend data objects 353a-c) may be updated with a graphical object corresponding to a shared, common, or consistent shape as a common graphical attribute of a set of graphical objects. The legend data objects 353 may additionally include a textual description related to the set, such as describing one or more common attributes (such as a type, title, or other attribute) of the set of graphical objects. For example, the legend data objects 353 may include a visual depiction of the common graphical attribute of the set of graphical objects and a textual description of the common attributes of the set. In some embodiments, the textual description maybe consistent with an industry standard or norm for the shape associated with the legend data object.

In some embodiments, the legend 350a may automatically identify a set of graphical objects that share a common shape and may populate the legend 350a with the common shape for the set along with the corresponding description of one or more common attributes of the set of graphical objects with the common shape. In some embodiments, the legend 350a may be updated based on shapes that are currently viewable in the graphical diagram, although it may be limited to a top number of hits (e.g., the three most frequently-occurring shapes in the current view of the graphical diagram), a threshold number of common shapes (e.g., all shapes with at least three instances of that shape in the current view of the graphical diagram), or any combination thereof (e.g., up to four legend data objects may be added, with each added legend data object including at least three instances of a given common shape).

In some embodiments, the user may interact with the legend 350a to manually create the legend data objects. For example, the user may be provided with suggestions or a selection pane of one or more shapes used in the graphical diagram from which the user can select a shape. Based on selecting a given shape by the user, the legend 350a may be updated with the selected given shape and a corresponding description may be provided by the user and/or automatically provided by the system (which may then be modified by the user). In some embodiments, the user may drag a shape from a graphical diagram and drop it onto the legend 350a. When such a drag and drop action occurs, a backend system may create a set of all graphical objects that share the shape that was dragged and dropped onto the legend 350a. The backend system may additionally or alternatively automatically create an associated textual description of the shape based on one or more common characteristics associated with the created set of graphical objects.

While described above for adding legend data objects 352 based on shape, it will be appreciated that the same or similar concepts are equally applicable to graphical objects sharing a common color, a common icon, or other characteristics. In these and other embodiments, the legend 350a may be updated to include one or more legend data objects that are based on color or icon rather than shape, or on line style (as described with reference to FIG. 3B) or conditional formatting rules (as described with reference to FIG. 3C). For example, an icon may include a small icon, character, or other visualization overlayed and/or associated with the general shape of the graphical object, such as placed near a top corner of the graphical object.

As illustrated in the graphical representation 301b of FIG. 3B, a user may interact with a legend 350b to add additional elements to the legend 350b. For example, a user may interact with the "add" icon 357 or an empty canvas (not shown) of the legend 350b. Such an interaction may call up a menu box. The menu box may include an option to add a shape item, add a color item, and/or add a line style item 373, with the line style item 373 option highlighted, indicating the user interacts with that particular option in the menu box.

The legend 350b also illustrates one or more generic legend data objects under a first title 380 for shape-based legend data objects and a second title 385 for color-based legend data objects.

As illustrated in the graphical representation 302b of FIG. 3B, the legend 350b may be updated to include one or more legend data objects under a third title 390 related to line styles. The legend 350b may include an add feature 391 with which the user may interact to add an additional line style-based legend data object. Additionally or alternatively, the legend 350b may include one or more generic line style legend data objects.

As illustrated in the graphical representation 303b of FIG. 3B, a menu box 392 may be displayed responsive to the interaction described with the graphical representation 302b. The menu box 392 may include an option to add line styles of different formats (e.g., solid, dashed, dashed and dotted, among others), line beginnings or endings (e.g., open arrows, closed arrows, circles, open circles, among others), and/or different modifiers (e.g., weight, double line, triple line, among others).

In some embodiments, the menu box 392 may include recommendations and/or may automatically populate the most frequently used line styles and/or modifiers. Additionally or alternatively, the menu box 392 may include the line styles and/or modifiers in a currently-displayed view.

As illustrated in the graphical representation 304b of FIG. 3B, the legend 350b may include a first line style legend data object 354a. The first line style legend data object 354a may include a visual representation of a line style used by one or more graphical objects in a graphical representation, and may include a textual explanation of what is conveyed by using the line style associated with the first line style legend data object 354a. In some embodiments, the line style may represent a feature, property, or aspect of the relationship between two graphical objects connected by a line using the line style. The legend 350b may additionally or alternatively include a second line style legend data object 354b that may depict a modifier of the line styles, such as a double line. The legend 350b may include the add feature 391 to add additional line style legend data objects.

In some embodiments, when adding the first line style legend data object 354a, the system may automatically propose or suggest a textual description of the first line style legend data object 354a. For example, the system may identify a common feature, property, or aspect of the relationships between sets of graphical objects connected by a line of the line style selected by the user to be included in the legend 350b and propose the text as the textual description. In some embodiments, an algorithm may involve finding a highest priority and/or most used feature, property, or aspect of the relationship to propose.

As illustrated in the graphical representation 301c of FIG. 3C, a user may interact with a legend 350c to add additional elements to the legend 350c. For example, a user may interact with the "add" icon 357 or an empty canvas (not shown) of the legend 350c. Such an interaction may call up a menu box 374. The menu box 374 may include an option to add a shape item, add a color item, add a line style item, and/or add a legend item with conditional formatting.

As illustrated in the graphical representation 302c of FIG. 3C, the legend 350c may include a first title 380 for shape-based legend data objects and a second title 385 for color-based legend data objects. The legend 350c may include a third title 395 for conditional formatting-based legend data objects. Underneath the third title 395, there may be one or more conditional formatting-based legend data objects 354e-g, and an add item icon 396.

The conditional formatting-based legend data objects 354e-g may be associated with one or more rules (such as an if . . . then . . . else clause) with formatting associated with the one or more rules. In some embodiments, the conditional formatting-based legend data objects 354e-g may include multiple entries in the legend 350c associated with the different formatting options (e.g., the explanatory phrase and/or visualization associated with both the then and the else clauses). For example, if there were a rule with if [[condition X]], then shape color is red, else shape color is grey, the conditional formatting-based legend data objects 354*e-g* may include a red color with the associated explanation (e.g., condition X is met), a gray color with the associated explanation (e.g., condition X is not met), and/or both. In some embodiments, the associated explanation may be based on the condition (e.g., the condition X). In some embodiments, the conditional formatting-based legend data objects 354*e-g* may automatically update both the visual representation in the legend 350*c* and the explanation when the condition changes. While color is used as an example, it will be appreciated that conditional formatting may use any of the graphical attributes described herein, such as shape, color, line formatting, line style, line ending, among others. Examples of conditional formatting for graphical objects may be described with greater detail in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Figure 4A:
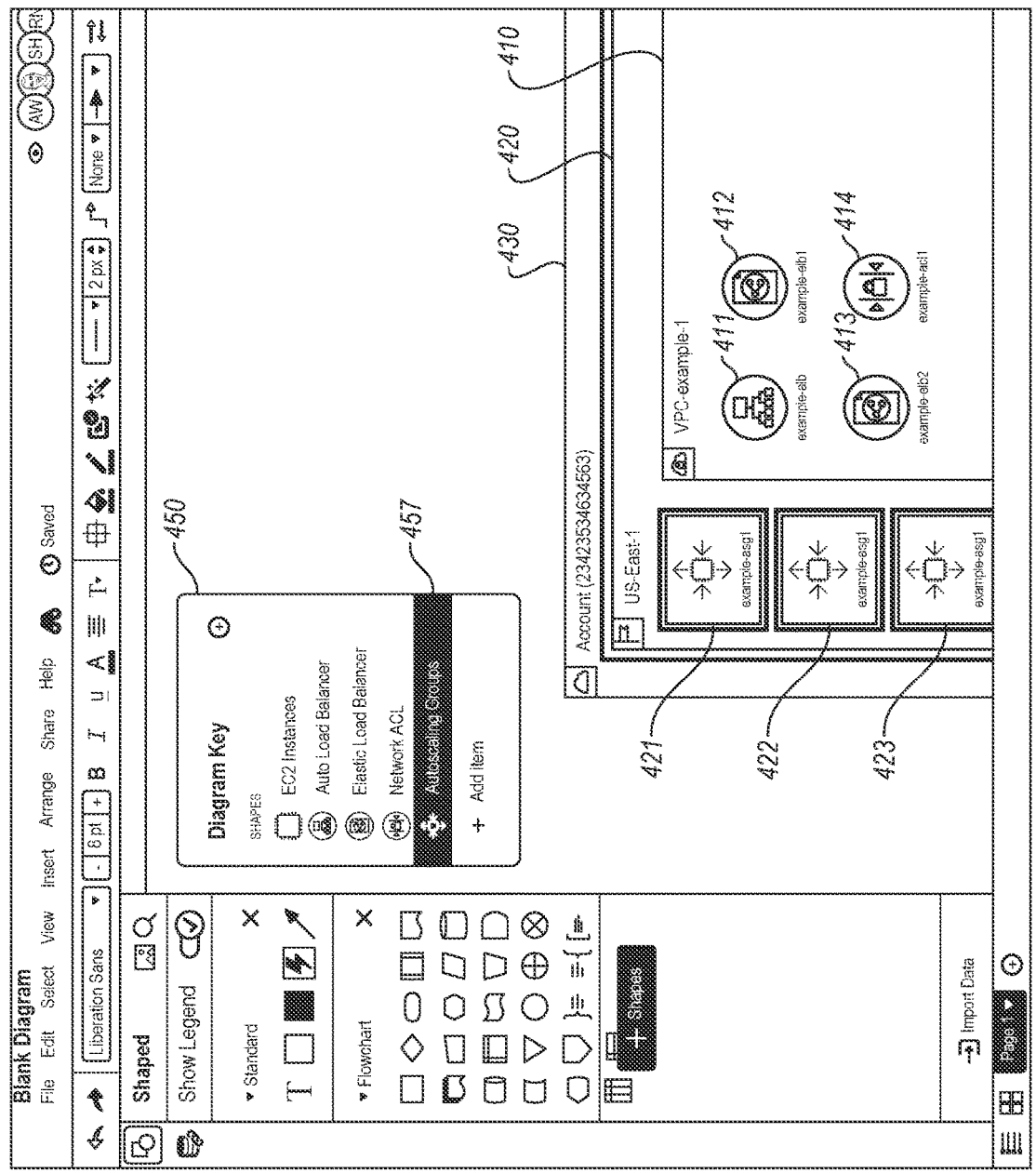
FIGS. 4A-4B illustrate graphical representations of UIs for interacting with a legend.
Figure 4B:
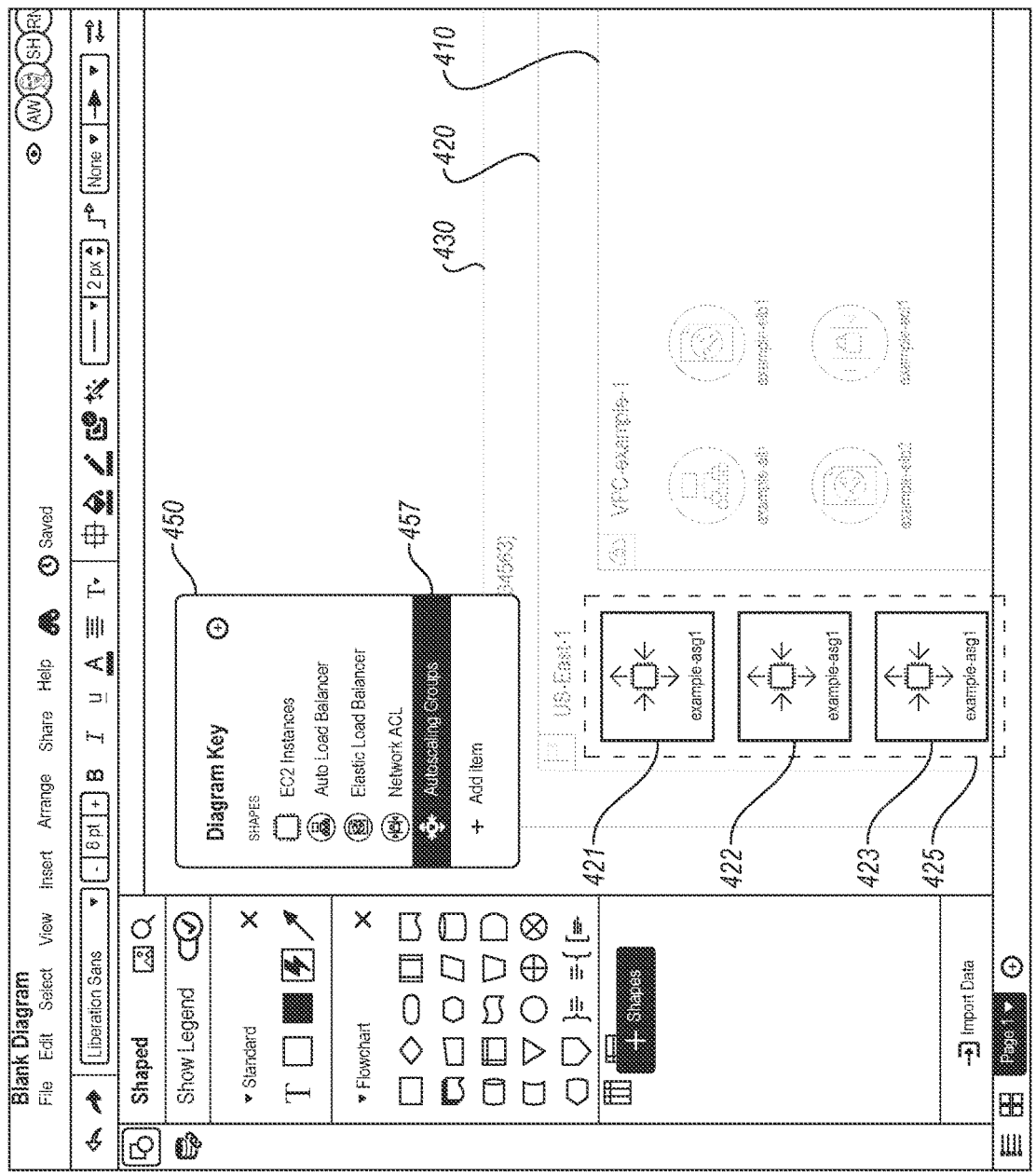

FIGS. 4A-4B illustrate graphical representations of UIs 400 (such as the UIs 400*a* and 400*b*) for interacting with a legend, in accordance with one or more embodiments of the present disclosure. FIG. 4A illustrates an example of selecting a group of graphical objects based on interacting with the legend. FIG. 4B illustrates an example of bringing focus to a group of graphical objects based on interacting with the legend.

As illustrated in FIG. 4A, the UI 400*a* may include a first group 410 of graphical objects 411, 412, 413, and 414, each with their own corresponding shape. The UI 400*a* also includes a second group 420 with graphical objects 421, 422, and 423, each which share a common shape, and a third group 430 without any graphical objects.

The UI 400*a* includes a legend 450. The legend 450 includes one or more legend data objects, such as the legend data object 457 that corresponds to the same shape as the graphical objects 421, 422, and 423.

When a user selects the legend data object 457 (for example, by clicking, tapping, or other approach), all of the graphical objects 421, 422, and 423 that share the same shape as the legend data object 457 may be automatically selected. In some embodiments, the selection of the legend data object 457 may include a special selection, such as double clicking, holding a key (like Ctrl) while clicking, or some other approach for selecting all of the graphical objects 421, 422, and 423 that share the same shape as the legend data object. In some embodiments, by selecting the legend data object 457, rather than selecting all of the graphical objects that share the same shape, the system may only select those graphical objects that are in a current view of the UI 400*a*. For example, the third group 430 may include one or more graphical objects that share the same shape as the graphical objects 421, 422, and 423 but may not be selected when selecting the legend data object 457 as such objects are not in a current view of the UI 400*a*.

By selecting all of the graphical objects that share the same shape (or all of the graphical objects in the current view that share the same shape), the user may be able to interact with, change properties of, or otherwise interact with all of the graphical objects with the same shape in a single action.

In some embodiments, by interacting with the legend data object 457, the user may change aspects of the set of graphical objects associated with the legend data object 457. For example, one or more properties associated with the legend data object 457 may be modified, and those changes may be automatically applied to all of the graphical objects and/or the underlying data being represented by the graphical objects. In some embodiments, the user may be asked before propagating changes to all of the graphical objects and/or before propagating changes back to a data source that the graphical objects are representing.

As illustrated in FIG. 4B, the UI 400*b* may include the first, second, and third groups 410, 420, and 430. The UI 400*b* may include the legend 450 with the legend data object 457 corresponding to the graphical objects 421, 422, and 423 of the same shape (which may be referred to as the set of graphical objects 425).

In some embodiments, when interacting with the legend data object 457, the user may be able to highlight or otherwise bring focus to the set of graphical objects 425 associated with the same shape as the legend data object 457. For example, the remainder of the graphical representations may be grayed out except for the set of graphical objects 425. As another example, the set of graphical objects 425 may be made larger in the UI 400*b*, be surrounded by a bright color, or be emphasized in any other way. In some embodiments, a corresponding deemphasis on the remainder of the UI 400*b* may be undertaken.

FIGS. 5-12 relate to implementation of and/or use of a legend associated with a graphical diagram. The methods may be performed by any suitable system, apparatus, or device. For example, the system 100 or one or more components thereof of FIG. 1 or the computing system 1300 of FIG. 13 may perform one or more of the operations associated with the methods. Although illustrated with discrete blocks, the steps and operations associated with one or more of the blocks of the methods may be divided into additional blocks, combined into fewer blocks, or eliminated, depending on the particular implementation.

Modifications, additions, or omissions may be made to the methods in FIGS. 5-12 without departing from the scope of the present disclosure. For example some of the operations of the methods in FIGS. 5-12 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the disclosed embodiments.

Figure 5:
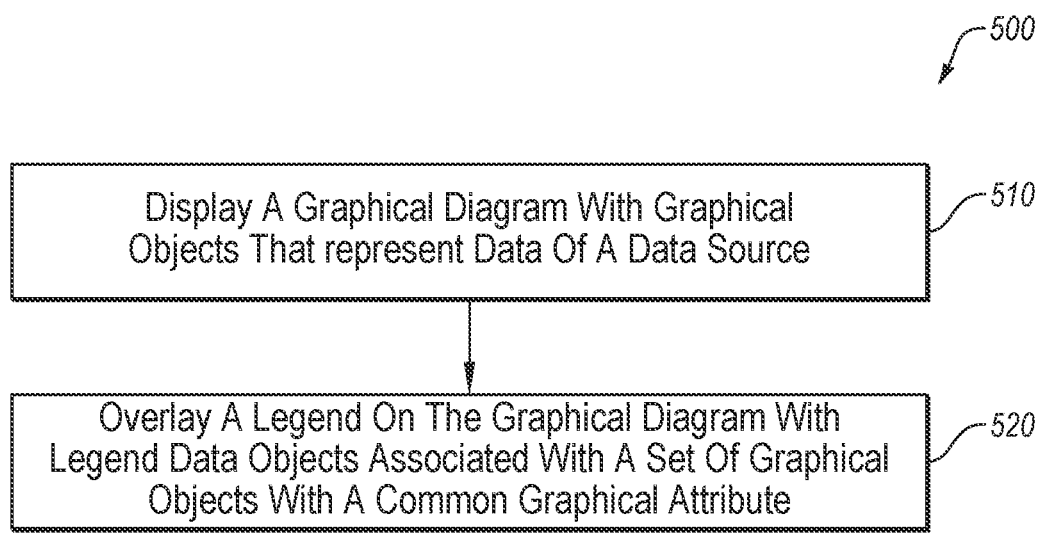
FIG. 5 illustrates a flowchart of an example method to implement a legend associated with a graphical diagram that may be implemented in the operating environment of FIG. 1 and/or the UIs of FIGS. 2-4B.

FIG. 5 illustrates a flowchart of an example method 500 to implement a legend associated with a graphical diagram that may be implemented in the operating environment of FIG. 1 and/or the UIs of FIGS. 2-4B.

At block 510, a graphical diagram may be displayed with graphical objects that represent data of a data source. An example of such a graphical diagram is illustrated in FIG. 2.

At block 520, a legend may be overlayed on the graphical diagram, where the legend may include one or more legend data objects. The legend data objects may each be associated with a corresponding set of graphical objects with a common graphical attribute. For example, a given legend data object may be associated with a set of graphical objects that all share the same shape while another legend data object may be associated with a set of graphical objects that all share the same color. In some embodiments, the legend data object may include a textual description that describes the meaning behind the common graphical attribute.

Figure 6:
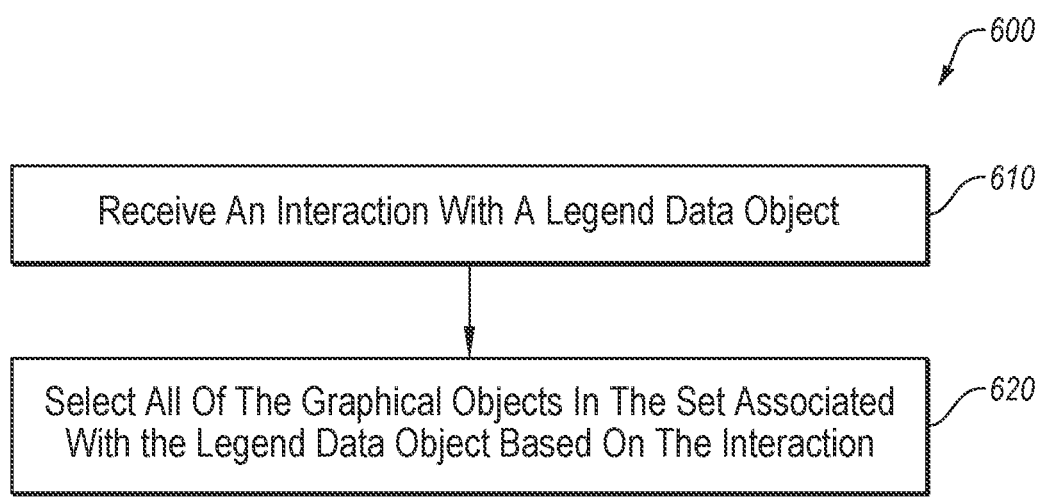
FIGS. 6-8 illustrate flowcharts of example methods to interact with a legend associated with a graphical diagram that may be implemented in the operating environment of FIG. 1 and/or the UIs of FIGS. 2-4B.
Figure 7:
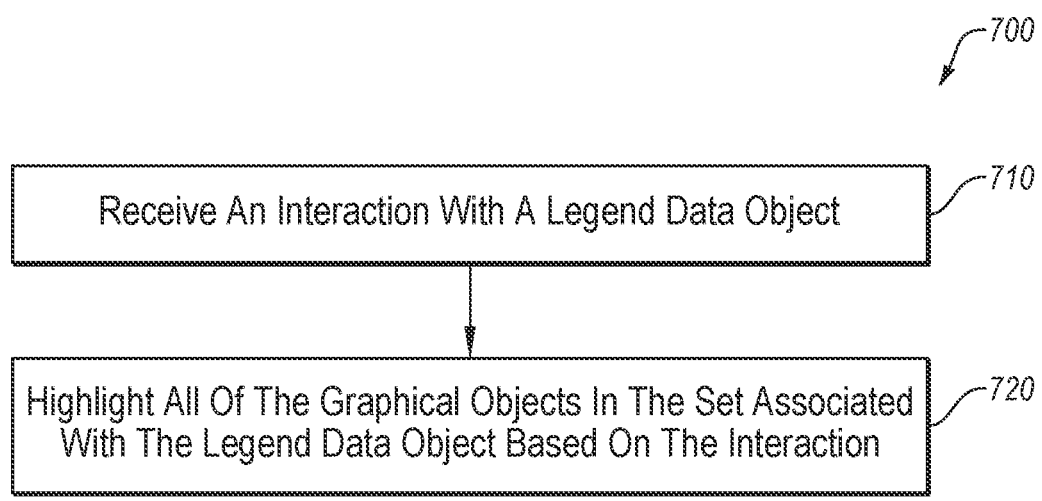
Figure 8:
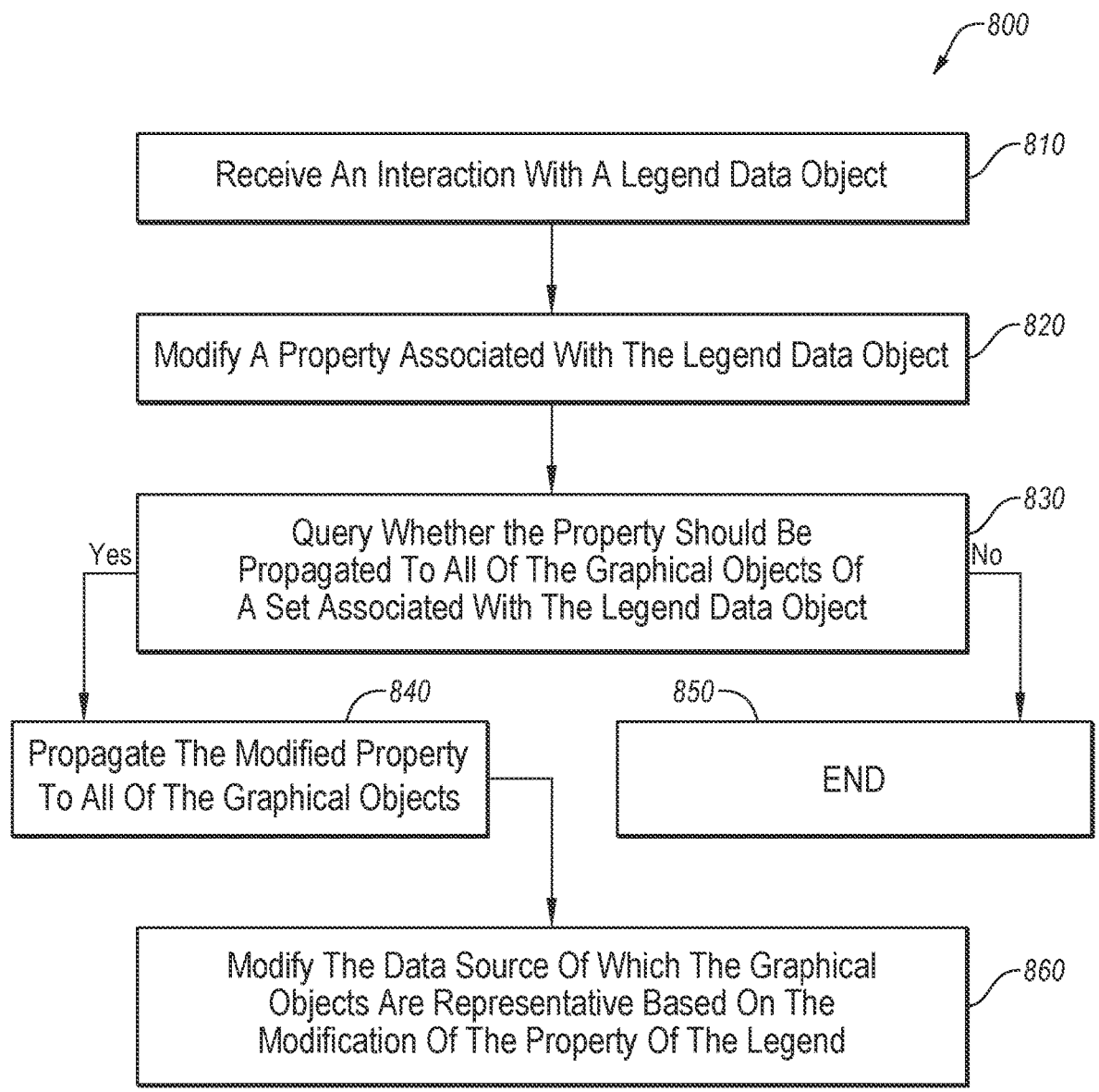

FIGS. 6, 7, and 8 illustrate flowcharts of example methods 600, 700, and 800, respectively, of interacting with a legend associated with a graphical diagram that may be implemented in the operating environment of FIG. 1 and/or the UIs of FIGS. 2-4B.

With reference to FIG. 6, at block 610, an interaction with a legend data object may be received. For example, a user may click, double click, tap, hold a key while clicking (such as Shift, Ctrl, or Alt), or any other interaction with the legend data object.

At block 620, all of the graphical objects in the set associated with the legend data object may be selected based on the interaction of the block 610. For example, if the legend data object is associated with the set of graphical objects that are green, by interacting with the green legend data object (e.g., with a Ctrl+click), all of the graphical objects that are the color green may be selected. In some embodiments, the block 620 may correspond to selecting the graphical objects in the set that are currently visible in a current view of the graphical diagram.

With reference to FIG. 7, at block 710, an interaction with a legend data object may be received. For example, a user may click, double click, tap, hold a key while clicking (such as Shift, Ctrl, or Alt), or any other interaction with the legend data object. In some embodiments, the block 710 may involve a different interaction than the block 610 of FIG. 6, such that one interaction leads to the block 620 and the selection of the graphical objects and a different interaction leads to the block 720.

At block 720, all of the graphical objects in the set associated with the legend data object may be highlighted based on the interaction of the block 710. For example, the graphical objects that all share the same common graphical attribute with the legend data object may be emphasized, be enlarged, be outlined in a bright color, or other highlighting or emphasizing approach based on the interaction at the block 710. In some embodiments, the block 720 may include deemphasizing (e.g., graying out, washing out, among others) the remainder of the graphical representation aside from the set of graphical objects. In some embodiments, the block 720 may highlight the graphical objects in the set associated with the legend data object that are viewable in a current view of the graphical representation, rather than all of the graphical objects in the set.

With reference to FIG. 8, at block 810, an interaction with a legend data object may be received. The block 810 may be similar or comparable to the operations 610 and 710 of FIGS. 6 and 7, although the actual interaction may be different. For example, there may be a first interaction (e.g., Shift+Click) for the block 610, a second interaction (e.g., Ctrl+click) for the block 710, and a third interaction (e.g., a right click) for the block 810.

At block 820, a property associated with a legend data object may be modified. For example, a user may right click or otherwise interact with the legend data object in a manner where properties of the legend data objects and/or the set of graphical objects associated therewith may be observed. For example, the legend data object may include a set of properties or characteristics that are common across all of the set of graphical objects that share the graphical attribute with the legend data object. In some embodiments, the set of properties or characteristics may include those that are common across a threshold number of graphical objects in the set (such as 75%, 80%, 85%, 90%, 95%, among others). After identifying a given property, a user may modify the property by changing a value of the property or characteristic. In some embodiments, the property changed may include a graphical attribute, such as changing the shape, a color, or some other graphical attribute.

At block 830, a query may be sent to a user inquiring whether the property should be propagated to all of the graphical objects of the set associated with the legend data object. For example, after changing the property, a message box or other notification may pop up asking the user whether or not the change in property of the block 820 should be applied to all of the graphical objects. If a yes answer to the query is received, the method 800 may proceed to the block 840. If a no answer to the query is received, the method 800 may proceed to the block 850 to end the method 800.

At block 840, the modified property may be propagated to all of the graphical objects associated with the legend data object.

At block 850, the method 800 may end.

At block 860, the data source of which the graphical objects are representative may be modified based on the modification of the property of the legend data object. For example, if the property modified at the block 820 is to be propagated to all of the objects and the property that is modified is a data property of the graphical objects, the change to the data property may be back-propagated to the data source. In some embodiments, the block 860 may occur after seeking confirmation from the user that the data source is to be changed. An example of such back-propagation changes to a data source may be described in the following U.S. patent documents which are incorporated herein by reference in their entireties: U.S. Patent Pub. No. 20200004865 (U.S. application Ser. No. 16/024,533, filed Jun. 29, 2018), U.S. Patent Pub. No. 20200004866 (U.S. application Ser. No. 16/024,544, filed Jun. 29, 2018), U.S. Patent Pub. No. 20200004872 (U.S. application Ser. No. 16/024,551, filed Jun. 29, 2018), and U.S. application Ser. No. 16/796,757, filed Feb. 20, 2020.

Figure 9:
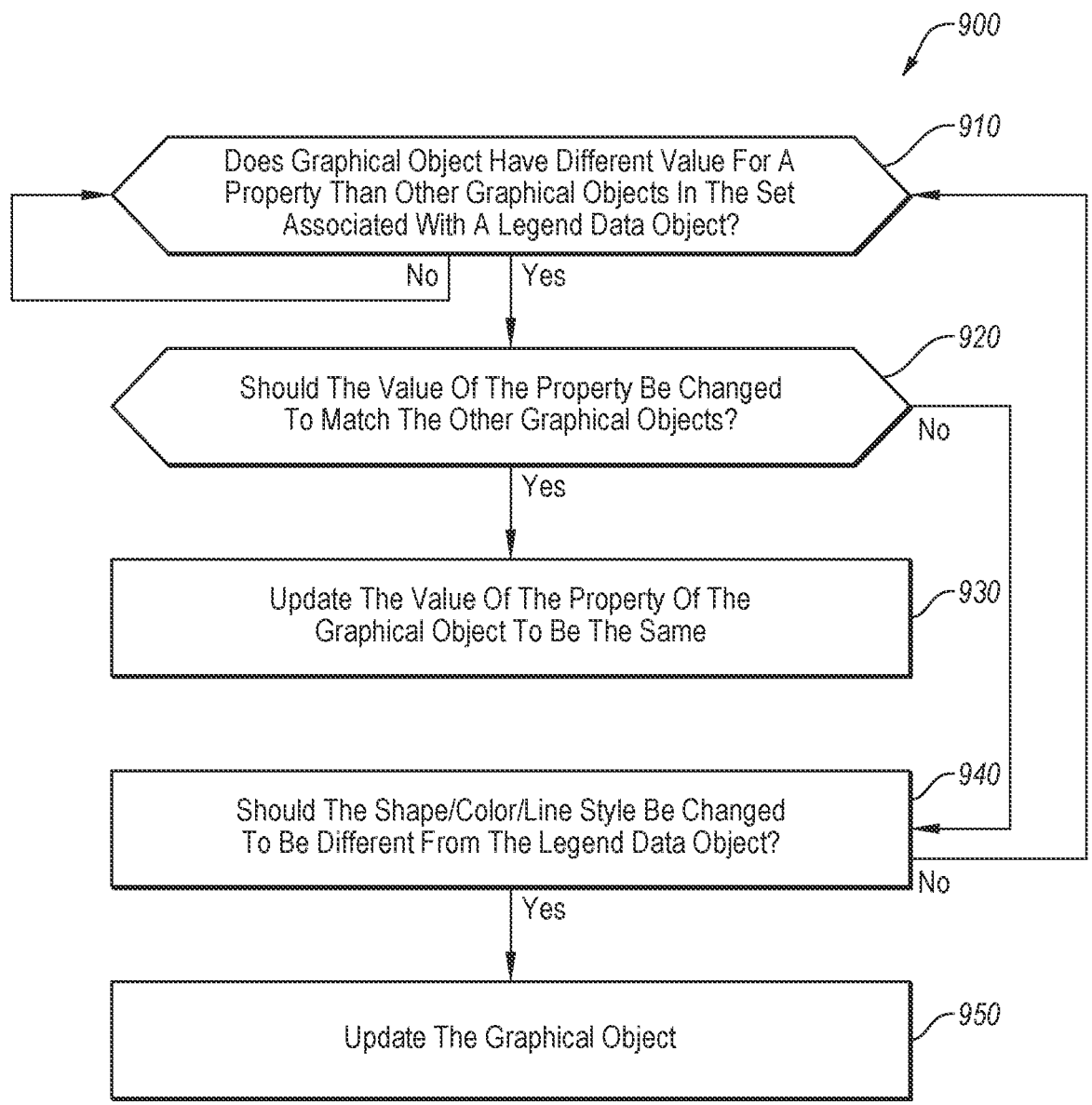
FIGS. 9 and 10 illustrate flowcharts of example methods to monitor properties of a graphical object associated with a graphical diagram that may be implemented in the operating environment of FIG. 1 and/or the UIs of FIGS. 2-4B.
Figure 10:
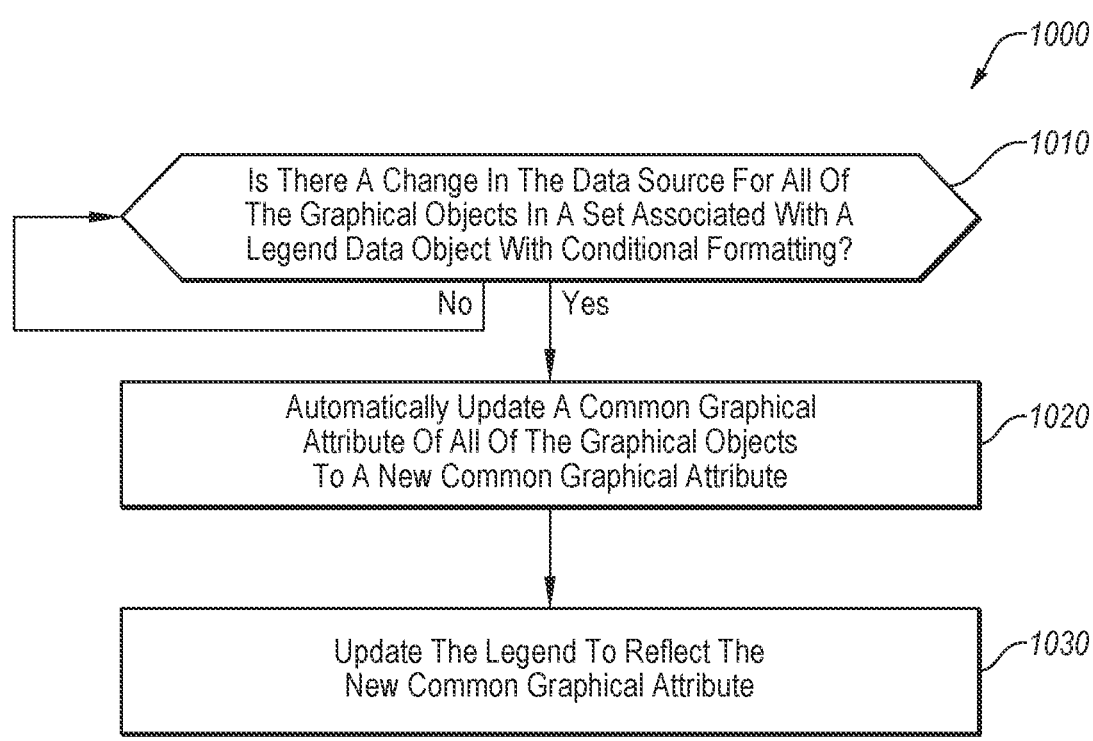

FIGS. 9 and 10 illustrate flowcharts of example methods 900 and 1000, respectively, to monitor properties of a graphical object associated with a graphical diagram that may be implemented in the operating environment of FIG. 1 and/or the UIs of FIGS. 2-4B.

With respect to FIG. 9 and method 900, at block 910, a determination may be made whether a graphical object has a different value for a property than other graphical objects in the set associated with a legend data object. For example, one or more properties of graphical objects in the set may be tracked for consistency in values. If the graphical object in question includes a property which is different from the other graphical objects in the set, the method 900 may proceed to the block 920. If not, the method 900 may return to the block 910 to continue to monitor for properties with different values.

At block 920, a determination may be made whether the value of the property should be changed to match the other graphical objects. For example, a user may be prompted or presented with a dialogue box asking whether the value of the property should be updated. If the value of the property should be changed, the method 900 may proceed to the block 930. If the value should not be changed, the method 900 may proceed to the block 940.

At block 930, the value of the property for the graphical object may be updated to be the same as the other graphical objects in the set associated with the legend data object. In some embodiments, such a property may be the same as or consistent with an industry standard term, shape, icon, or other value.

At block 940, a determination may be made whether the shape/color/line style be changed to be different from the legend data object. For example, based on the difference in properties identified at the block 910, the user may have intended for the graphical object to have a different graphical attribute than that of the legend data object, and the user may be queried whether or not that was intended. If the response is yes, the method 900 may proceed to the block 950. If the response is no, the method 900 may return to the block 910 to monitor for properties different than the others in the set. In some embodiments, the block 940 may include any common graphical attribute for the set which may be different from shape, color, and/or line style. For example, the common graphical attribute may be a conditional formatting-based legend data object with an associated common graphical attribute.

At block 950, the graphical object may be updated. For example, based on the user indicating that the graphical object should be changed, one of the visual characteristics may be changed to something different from the legend data object (e.g., changing the color of the graphical object from a red color like the legend data object to an orange color).

With respect to FIG. 10 and method 1000, at block 1010, a determination may be made whether there is a change in the data source for all of the graphical objects in a set associated with a legend data object with conditional formatting. In some embodiments, it may be determined if the change in the data source is to the property or attribute associated with and described by a textual aspect of the legend data object. For example, if the legend data object was the color red and the textual description was "manager," the determination may monitor whether the field "manager" for the graphical objects was changed. If the data source has been changed for all of the graphical objects in the set, the method 1000 may proceed to the block 1020. If the data source has not been changed for all of the graphical objects, the method 1000 may return to the block 1010 to continue to monitor for changes in the data source.

At block 1020, a common graphical attribute of all of the graphical objects may be automatically updated to a new common graphical attribute based on the change in the data source. For example, the common graphical attributes may be changed based on a stored conditional formatting rule. As another example, based on a different set of graphical objects that share the same property to which all of the graphical attributes have been changed, the graphical attributes for the set of graphical objects may be changed to the different set of graphical objects.

At block 1030, the legend may be updated to reflect the new common visual characteristic. For example, the legend data object associated with the set of graphical objects may be updated so the legend data object includes the new common graphical attribute of the block 1020. Additionally of alternatively, a textual aspect of the legend data object may be updated to reflect the updated property or attribute determined to have been changed at the block 1010. As another example, a new legend data object may be generated or placed on the legend corresponding to the new common graphical attribute.

Figure 11:
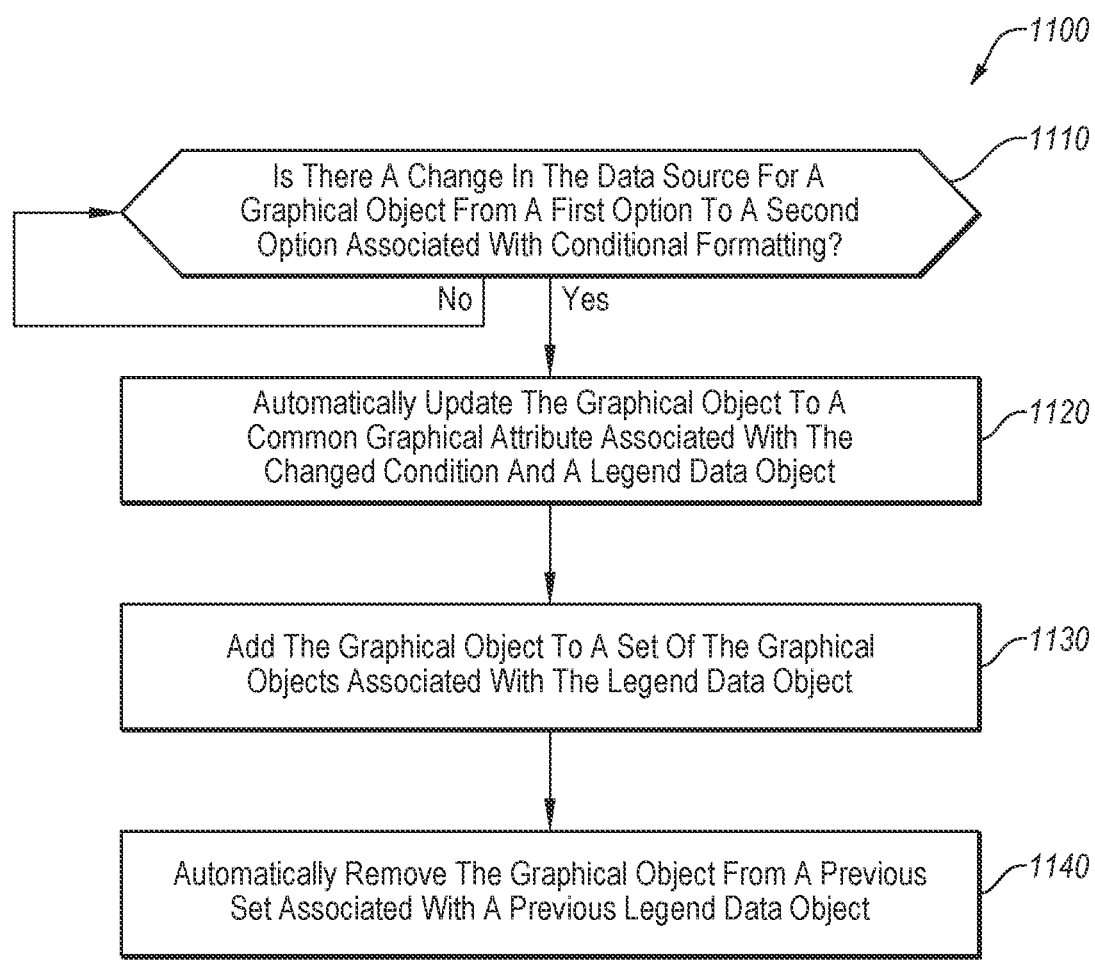
FIG. 11 illustrates a flowchart of an example method to implement a legend associated with a graphical diagram that utilizes conditional formatting and may be implemented in the operating environment of FIG. 1 and/or the UIs of FIGS. 2-4B.

FIG. 11 illustrates a flowchart of an example method 1100 to implement a legend associated with a graphical diagram that utilizes conditional formatting and may be implemented in the operating environment of FIG. 1 and/or the UIs of FIGS. 2-4B.

At block 1110, a determination may be made if there is a change in the data source for a graphical object from a first option to a second option associated with conditional formatting. For example, the conditional formatting rule may include a first graphical attribute for the first option and a second graphical attribute for the second option. If the data source is changed, the method 1100 may proceed to the block 1120. If the data source is not changed, the method 1100 may return to the block 1110 to continue to monitor for changes.

At block 1120, the graphical object may be automatically updated to a common graphical attribute associated with the changed condition and a legend data object. For example, the legend may include a legend data object associated with the second graphical attribute and based on the change in the data source, the graphical object may be changed to the second graphical attribute.

At block 1130, the graphical object may be added to a set of graphical objects associated with the legend data object. For example, the set of graphical objects may be those already using the graphical attribute to which the graphical object is changed, e.g., the set of graphical objects associated with second graphical attribute and the legend data object associated with the second graphical attribute. In some embodiments, this may occur automatically without any user input.

At block 1140, the graphical object may be automatically removed from a previous set of graphical objects associated with a previous legend data object. For example, the graphical object may be removed from the set associated with the first graphical attribute.

Figure 12:
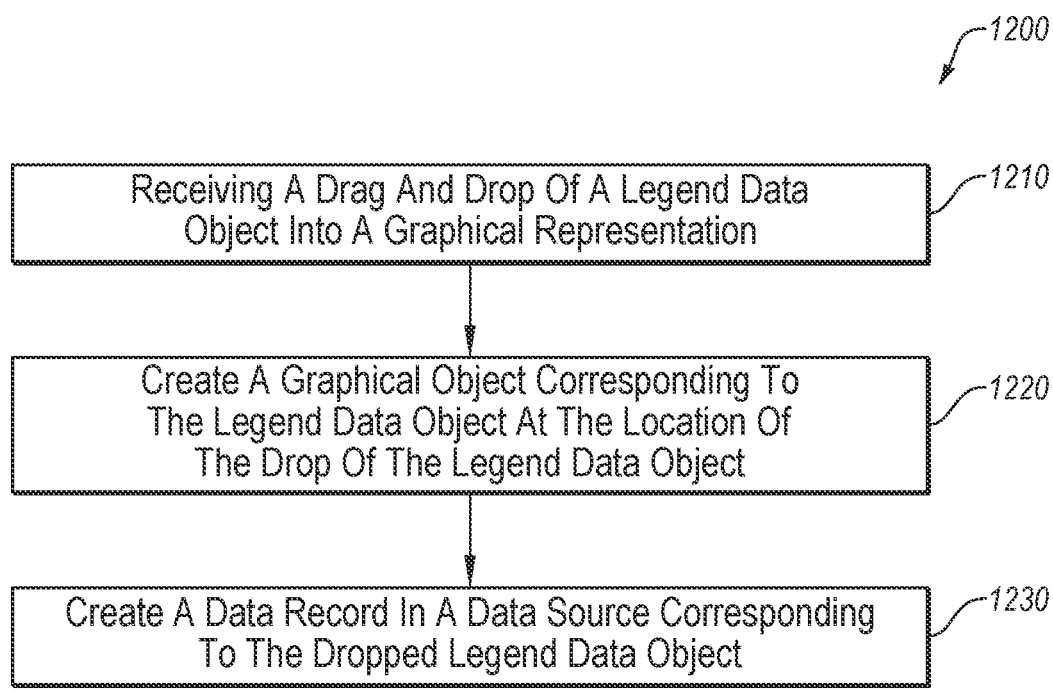
FIG. 12 illustrates a flowchart of an example method to supplement a graphical diagram using a legend in the operating environment of FIG. 1 and/or the UIs of FIGS. 2-4B.

FIG. 12 illustrates a flowchart of an example method 1200 to supplement a graphical diagram using a legend in the operating environment of FIG. 1 and/or the UIs of FIGS. 2-4B.

At block 1210, a drag and drop of a legend data object into a graphical representation may be received. For example, a user may select and drag an instance of the legend data object to a desired location within the graphical representation.

At block 1220, a graphical object corresponding to the legend data object may be created in the graphical representation at the location corresponding to the drop of the legend data object. For example, if a given shape, or a given line style is dragged and dropped into the graphical representation, a corresponding graphical object if the same given shape or the same given line style may be created. In some embodiments, the textual description and/or other aspects of the graphical object may be the same or consistent with an industry standard or norm for the shape, icon, or other attribute. For example, if the industry standard or norm is for a given feature to be depicted using a certain shape and color which are used by the legend data object, the graphical object may be created in a similar manner.

At block 1230, a data record may be created in the data source corresponding to the graphical object created at the block 1220. In some embodiments, the new data record created may include one or more of the properties that are consistent (or consistent above a threshold level) across the set of graphical objects associated with the legend data object. In some embodiments, the new data record created may include at least the property associated with a textual description of the legend data object. Continuing the example above, if the shape and/or color correspond to an industry standard or norm, the new data record may include properties related to the industry standard or norm.

Figure 13:
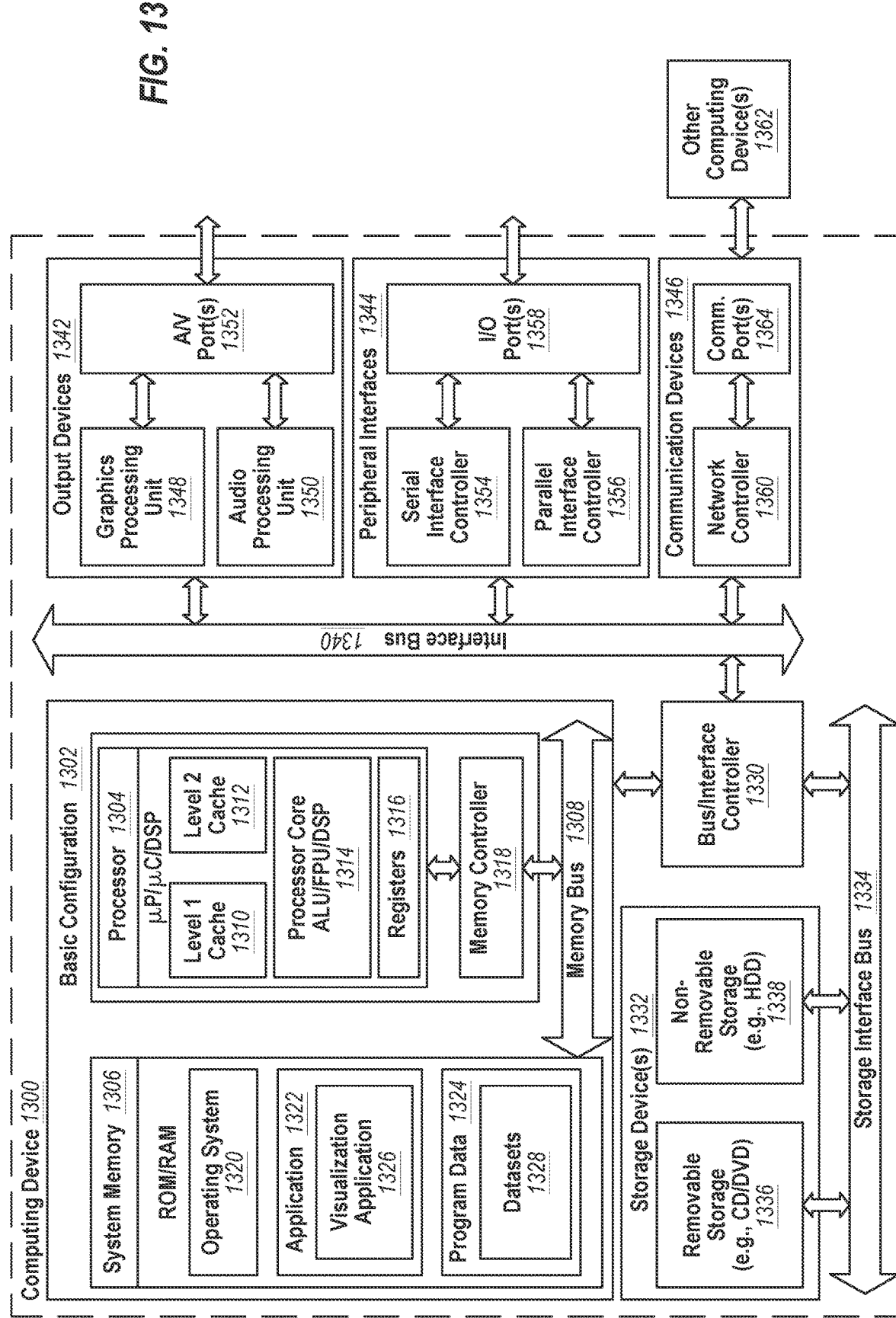
FIG. 13 is a block diagram illustrating an example computing device that is arranged to generate and/or display graphical diagrams, all arranged in accordance with at least one embodiment described herein.

FIG. 13 is a block diagram illustrating an example computing device 1300 that is arranged to generate and/or display graphical diagrams, arranged in accordance with at least one embodiment described herein. The computing device 1300 may include, be included in, or otherwise correspond to either or both of the server 102 or the client devices 104, 106, 108 of FIG. 1. In a basic configuration 1302, the computing device 1300 typically includes one or more processors 1304 and a system memory 1306. A memory bus 1308 may be used to communicate between the processor 1304 and the system memory 1306.

Depending on the desired configuration, the processor 1304 may be of any type including, but not limited to, a microprocessor (μP), a microcontroller (μC), a digital signal processor (DSP), or any combination thereof. The processor 1304 may include one or more levels of caching, such as a level one cache 1310 and a level two cache 1312, a processor core 1314, and registers 1316. The processor core 1314 may include an arithmetic logic unit (ALU), a floating point unit (FPU), a digital signal processing core (DSP Core), or any combination thereof. An example memory controller 1318 may also be used with the processor 1304, or in some implementations the memory controller 1318 may include an internal part of the processor 1304.

Depending on the desired configuration, the system memory 1306 may be of any type including volatile memory (such as RAM), nonvolatile memory (such as ROM, flash memory, etc.), or any combination thereof. The system memory 1306 may include an operating system 1320, one or more applications 1322, and program data 1324. The application 1322 may include a diagram application 1326 that is arranged to generate and/or display graphical diagrams. The diagram application 1326 may include, be included in, or otherwise correspond to the diagram application 114 of FIG. 1. The program data 1324 may include datasets 1328 (which may include, be included in, or otherwise correspond to the graphical diagrams 126 of FIG. 1) as is described herein, structured source data collections (such as structured source data 120 of FIG. 1), models of structured source data (such as models 122 of FIG. 1) and/or other graphical data. In some embodiments, the application 1322 may be arranged to operate with the program data 1324 on the operating system 1320 such that one or more methods may be provided as described herein.

The computing device 1300 may have additional features or functionality, and additional interfaces to facilitate communications between the basic configuration 1302 and any involved devices and interfaces. For example, a bus/interface controller 1330 may be used to facilitate communications between the basic configuration 1302 and one or more data storage devices 1332 via a storage interface bus 1334. The data storage devices 1332 may be removable storage devices 1336, non-removable storage devices 1338, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 1306, the removable storage devices 1336, and the non-removable storage devices 1338 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other non-transitory medium which may be used to store the desired information and which may be accessed by the computing device 1300. Any such computer storage media or non-transitory computer-readable media may be part of the computing device 1300.

The computing device 1300 may also include an interface bus 1340 to facilitate communication from various interface devices (e.g., output devices 1342, peripheral interfaces 1344, and communication devices 1346) to the basic configuration 1302 via the bus/interface controller 1330. The output devices 1342 include a graphics processing unit 1348 and an audio processing unit 1350, which may be configured to communicate to various external devices such as a display or speakers via one or more A/V ports 1352. Diagrams, flowcharts, organizational charts, connectors, and/or other graphical objects generated by the diagram application 1326 may be output through the graphics processing unit 1348 to such a display. The peripheral interfaces 1344 include a serial interface controller 1354 or a parallel interface controller 1356, which may be configured to communicate with external devices such as input devices (e.g., keyboard, mouse, pen, voice input device, touch input device, etc.), sensors, or other peripheral devices (e.g., printer, scanner, etc.) via one or more I/O ports 1358. Such input devices may be operated by a user to provide input to the diagram application 1326, which input may be effective to, e.g., generate curved connectors, designate points as designated points of one or more curved connectors, relocate one or more designated points, and/or to accomplish other operations within the diagram application 1326. The communication devices 1346 include a network controller 1360, which may be arranged to facilitate communications with one or more other computing devices 1362 over a network communication link via one or more communication ports 1364.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 1300 may be implemented as a portion of a small-form factor portable (or mobile) electronic device such as a smartphone, a personal data assistant (PDA) or an application-specific device. The computing device 1300 may also be implemented as a personal computer including tablet computer, laptop computer, and/or non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present disclosure.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method, the method comprising:
    displaying, on a display device, a graphical diagram with a plurality of graphical objects that represent data of a data source, the plurality of graphical objects belonging to one or more sets of graphical objects;
    overlaying a legend on the graphical diagram, the legend including one or more legend data objects, each legend data object associated with a different set of graphical objects of the one or more sets of graphical objects, each graphical object in a given set of graphical objects of the one or more sets of graphical objects including a common graphical attribute;
    receiving a user interaction dragging a first legend data object of the one or more legend data objects from the legend and dropping the first legend data object into the graphical diagram, the first legend data object associated with a first set of the one or more sets of graphical objects;
    creating a graphical object in the graphical diagram where the first legend data object is dropped, the created graphical object including one or more properties consistent with the first set of graphical objects associated with the first legend data object;
    detecting a first member of the given set of graphical objects includes a first value for a property different than values for the property for a plurality of other members of the given set of graphical objects;
    querying whether the first value for the property of the first member should be changed to be consistent with the values for the plurality of other members of the given set of graphical objects;
    based on a response indicating that the first value for the property of the first member should not be changed, querying whether a shape, color, or line style of the first member should be changed to be different from a given legend data object associated with the given set of graphical objects; and
    based on a response indicating that the shape, color, or line style of the first member should be changed to be different from the given legend data object, updating the first member to have the shape, color, or line style that is different from the given legend data object.

2. The computer-implemented method of claim 1, wherein:
    the common graphical attribute for the given set of graphical objects comprises at least one of a common shape, a common color, a common line ending, a common icon, or a common line style shared by members of the given set of graphical objects;
    the given legend data object of the one or more legend data objects is associated with the given set of graphical objects; and
    the given legend data object includes the at least one of the common shape, the common color, the common line ending, the common icon, or the common line style shared by the members of the given set of graphical objects.

3. The computer-implemented method of claim 1, wherein the one or more legend data objects are configured to be user-interactable, and wherein, upon interacting with the given legend data object of the one or more legend data objects, the given set of graphical objects associated with the given legend data object are all selected such that by interacting with the given legend data object, all members of the given set are interacted with.

4. The computer-implemented method of claim 3, wherein the interacting with the given legend data object causes the graphical diagram to highlight the members of the given set of graphical objects and deemphasize a remainder of the graphical diagram.

5. The computer-implemented method of claim 3, further comprising:
selecting the given legend data object;
modifying a property associated with the given legend data object; and
propagating the modified property to the members of the given set of graphical objects.

6. The computer-implemented method of claim 5, further comprising:
prior to propagating the modified property, querying whether the modified property should be propagated to the members of the given set of graphical objects;
wherein the propagating is performed based on an affirmative response to the query.

7. The computer-implemented method of claim 5, further comprising modifying the data source of which the graphical objects of the given set of graphical objects are representative based on the modifying of the property such that the data source reflects the modified property.

8. The computer-implemented method of claim 1, wherein the common graphical attribute is associated with a condition resulting in the common graphical attribute, the method further comprising:
identifying a change in the data source for all members of the given set of graphical objects, the change in the data source resulting in a change in the condition;
based on the change in the condition, automatically updating the common graphical attribute of all members of the given set of graphical objects to a new common graphical attribute; and
updating the given legend data object of the one or more legend data objects that is associated with the given set of graphical objects to reflect the new common graphical attribute and the change in the condition.

9. The computer-implemented method of claim 1, wherein the common graphical attribute for the given set of graphical objects is associated with a condition with at least two options, the common graphical attribute associated with a first option of the condition, the method further comprising:
identifying a change in the data source for a given graphical object from a second option of the condition to the first option of the condition;
based on the change in the condition, automatically updating the given graphical object to include the common graphical attribute for the given set of graphical objects; and
adding the given graphical object to the given set of graphical objects, the given set of graphical objects associated with the given legend data object of the one or more legend data objects, the given legend data object associated with the first option of the condition.

10. The computer-implemented method of claim 9, further comprising automatically removing the given graphical object from a second set of graphical objects associated with a second legend data object associated with the second option of the condition.

11. The computer-implemented method of claim 1, further comprising automatically creating a data record in the data source associated with the created graphical object, the data record including the one or more properties consistent with the first set of graphical objects associated with the first legend data object.

12. A non-transitory computer-readable medium having computer-readable instructions stored thereon that are executable by a processor to perform or control performance of operations, the operations comprising:
displaying, on a display device, a graphical diagram with a plurality of graphical objects that represent data of a data source, the plurality of graphical objects belonging to one or more sets of graphical objects;
overlaying a legend on the graphical diagram, the legend including one or more legend data objects, each legend data object associated with a different set of graphical objects of the one or more sets of graphical objects, each graphical object in a given set of graphical objects of the one or more sets of graphical objects including a common graphical attribute;
receiving a user interaction dragging a first legend data object of the one or more legend data objects from the legend and dropping the first legend data object into the graphical diagram, the first legend data object associated with a first set of the one or more sets of graphical objects;
creating a graphical object in the graphical diagram where the first legend data object is dropped, the created graphical object including one or more properties consistent with the first set of graphical objects associated with the first legend data object;
detecting a first member of the given set of graphical objects includes a first value for a property different than values for the property for a plurality of other members of the given set of graphical objects;
querying whether the first value for the property of the first member should be changed to be consistent with the values for the plurality of other members of the given set of graphical objects;
based on a response indicating that the first value for the property of the first member should not be changed, querying whether a shape, color, or line style of the first member should be changed to be different from a given legend data object associated with the given set of graphical objects; and
based on a response indicating that the shape, color, or line style of the first member should be changed to be different from the given legend data object, updating the first member to have the shape, color, or line style that is different from the given legend data object.

13. The non-transitory computer-readable medium of claim 12, wherein:
the common graphical attribute for the given set of graphical objects comprises at least one of a common shape, a common color, a common line ending, a common icon, or a common line style shared by members of the given set of graphical objects;
the given legend data object of the one or more legend data objects is associated with the given set of graphical objects; and
the given legend data object includes the at least one of the common shape, the common color, the common line ending, the common icon, or the common line style shared by the members of the given set of graphical objects.

14. The non-transitory computer-readable medium of claim 12, wherein the one or more legend data objects are configured to be user-interactable, and wherein, upon interacting with the given legend data object of the one or more legend data objects, the given set of graphical objects associated with the given legend data object are all selected such that by interacting with the given legend data object, all members of the given set are interacted with.

15. The non-transitory computer-readable medium of claim 14, wherein the interacting with the given legend data object causes the graphical diagram to highlight the members of the given set of graphical objects and deemphasize a remainder of the graphical diagram.

16. The non-transitory computer-readable medium of claim 14, further comprising:
   selecting the given legend data object;
   modifying a property associated with the given legend data object; and
   propagating the modified property to the members of the given set of graphical objects.

17. The non-transitory computer-readable medium of claim 16, further comprising:
   prior to propagating the modified property, querying whether the modified property should be propagated to the members of the given set of graphical objects;
   wherein the propagating is performed based on an affirmative response to the query.

18. The non-transitory computer-readable medium of claim 16, further comprising modifying the data source of which the graphical objects of the given set of graphical objects are representative based on the modifying of the property such that the data source reflects the modified property.

\* \* \* \* \*